Dec. 22, 1953

J. F. BELL 2,663,799

ULTRAHIGH-FREQUENCY OSCILLATION GENERATOR

Filed May 27, 1950

JOHN F BELL
INVENTOR.

BY Francis W. Crotty
HIS ATTORNEY

Patented Dec. 22, 1953

2,663,799

UNITED STATES PATENT OFFICE 2,663,799

ULTRAHIGH-FREQUENCY OSCILLATION GENERATOR

John F. Bell, Glenview, Ill., assignor to Zenith Radio Corporation, a corporation of Illinois Application May 27, 1950, Serial No. 164,784

7 Claims. (Cl. 250—36)

This invention is directed to ultra-high-frequency oscillation generators. As used throughout the specification, the term "ultra-high-frequency" refers to frequencies in excess of 100 mc./s. (megacycles per second) and the term "wide frequency range" refers to a range of frequencies extending for at least one-half the lowest frequency in the range. While being subject to a variety of applications, the invention is especially suited for use in a wave-signal receiver of the superheterodyne type and will be particularly described in that connection.

When receivers of the type under consideration are to be operated at ultra-high-frequencies, certain difficulties are encountered in their construction. For example, conventional oscillatory circuits which have been utilized in prior-art arrangements do not permit optimum operation to be realized. This results from the fact that the interelectrode capacitances and electrode-lead inductances represent appreciable reactive impedances at ultra-high-frequencies which may have a pronounced effect on the operating characteristics of the oscillator and in the usual case impair its operating characteristics.

It is an object of the present invention, therefore, to provide an improved ultra-high-frequency oscillation generator which avoids the above-mentioned limitation of prior-art arrangements.

It is another object of the invention to provide an improved ultra-high-frequency oscillation generator which makes effective use of its inherent circuit reactances.

An ultra-high-frequency oscillation generator, in accordance with the present invention, comprises an electron-discharge device having anode, cathode and control electrodes. The generator includes a condenser having a capacitance small relative to the interelectrode capacitances of the electron-discharge device and an inductor of such inductance value as to resonate with the condenser at a frequency corresponding approximately to the desired operating frequency of the oscillator. Conductive means are provided for connecting the condenser and the inductor in series relation between the anode and control electrodes of the electron-discharge device. The generator further includes a cathode impedance connected to the anode and control electrodes to complete an oscillation generating system in which the operating frequency is determined by a single-mesh resonant circuit comprising the anode-control electrode inter-electrode capacitance of the device, the condenser, the inductor, and the self-inductance of the conductive means.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawing in which:

Figures 1, 2, 3, 4:
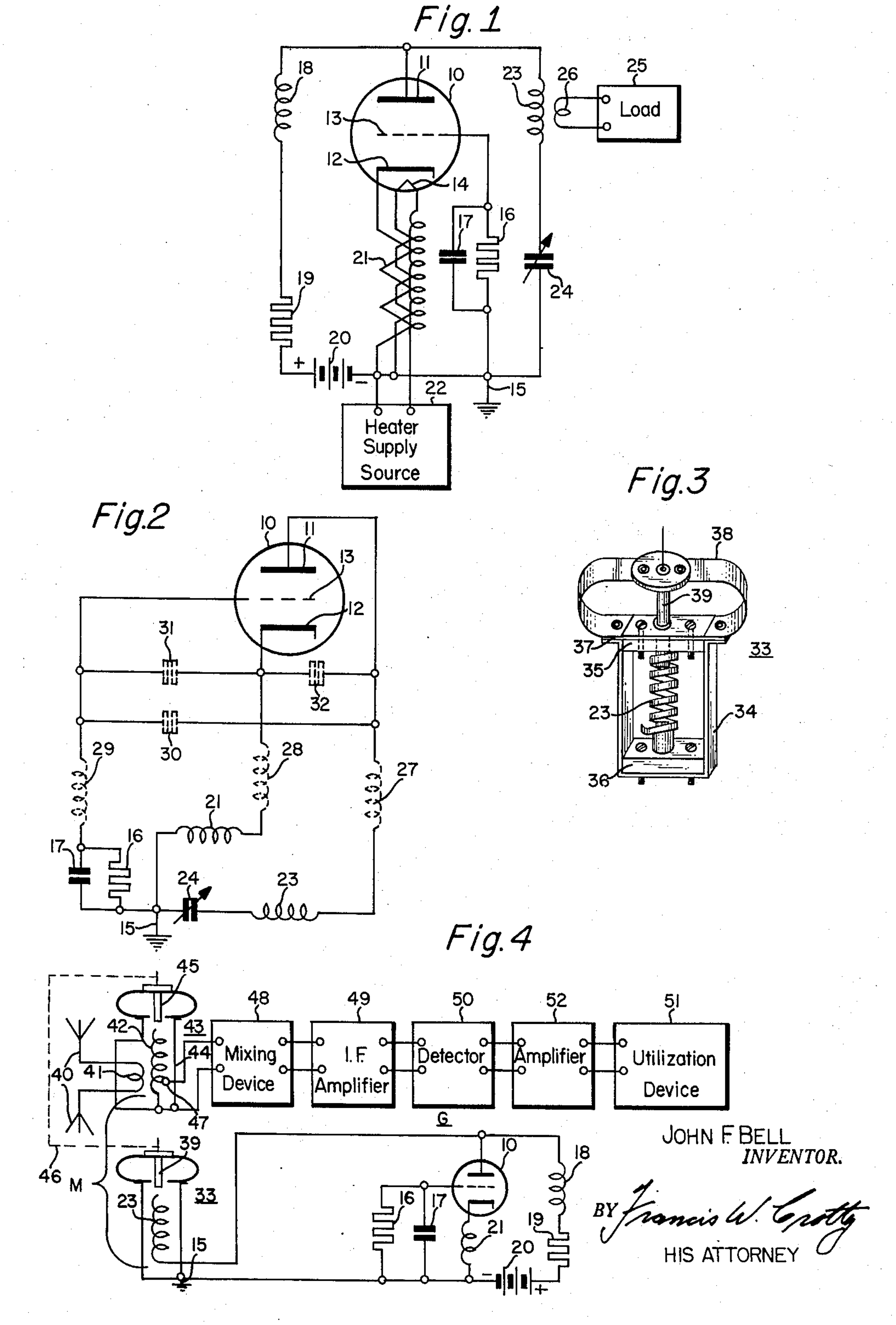
Fig. 1 is a schematic circuit diagram of an oscillation generator in accordance with the invention.
Fig. 2 represents the alternating current circuits of the generator shown in Fig. 1.
Fig. 3 is a perspective view of a resonant circuit which may be utilized in the oscillation generator of Fig. 1.
Fig. 4 represents a complete superheterodyne receiver including an oscillation generator in accordance with the invention.

Referring now more particularly to Fig. 1, there is represented an ultra-high-frequency oscillation generator that is tunable or adjustable over a wide range of frequencies. This generator comprises an electron-discharge device, specifically a triode vacuum tube 10 having an anode 11, a cathode 12 and a control electrode 13. A heater element 14 is provided for maintaining cathode 12 at operating temperature. The control electrode 13 is connected to a ground plane 15 through the parallel combination of a grid leak 16 and a grid condenser 17. The anode 11 is connected to the series combination of an R. F. choke 18 and a resistor 19 in turn connected to the positive terminal of a source of B-supply potential 20, the negative terminal of which is grounded at 15. The cathode 12 is grounded through an impedance 21 formed by one winding of a tri-filar R. F. choke system the other two windings of which are in series with respective leads of heater 14. One of the filament windings is grounded and a source of heater supply potential 22 is connected between ground and the free end of the other heater winding. The anode 11 is connected to ground 15 through an inductor 23 and a variable condenser 24, and thus the condenser and inductor are in series relation between the anode and the control electrode. A load 25 is inductively coupled to inductor 23 by means of a coil 26.

The description thus far has taken into consideration only those impedance elements external to tube 11. It will be appreciated that certain inherent reactances are associated with vacuum tube 10. These reactances include the self-inductances of the electrode leads conventionally utilized for making circuit connections to the tube and the inherent interelectrode capacitances. The lead inductances, represented in Fig. 2, are as follows: anode-lead inductance 27 in series between coil 23 and anode electrode 11; cathode-lead inductance 28 in series between choke 21 and cathode 12; and grid-lead inductance 29 in series between the grid-leak and condenser 16—17 and grid 13. The interelectrode capacitances are as follows: grid-plate capacitance represented by a condenser 30 connected directly between these electrodes; grid-cathode capacitance represented by a condenser 31 connected directly between these electrodes; and anode-cathode capacitance represented by a condenser 32 connected directly between these electrodes.

The inductance of cathode impedance 21 is selected to isolate the cathode from ground at the operating frequencies while completing the D. C. connection from cathode to ground. The inductance value is such as to permit the cathode to assume a potential determined by the capacity voltage divider consisting of condenser 31 and condenser 32. The voltage across condenser 30 is divided between these two condensers and thus the cathode is placed at a potential between that of the anode and that of the control electrode, which is required for oscillation. Since the leads to these condensers are almost nonexistent, the required phase relations are provided over the entire operating frequency range for oscillation generator. Preferably, the inductance of inductor 21 is chosen so that the circuit with inductor 28 and condenser 31 is resonant at some frequency lower than the lowest extremity of the operating range of frequencies for the oscillation generator. This makes the effective impedance between the control electrode and the cathode higher than the impedance of condenser 32 that is between anode and cathode.

Condenser 24 is selected to have a capacitance small relative to the interelectrode capacitances 30, 31 and 32 of tube 10 and specifically this capacitance is no greater than one-half the capacitance 30. Inductor 23 has such an inductance value as to resonate with condenser 24 at a frequency corresponding approximately to a desired operating frequency of the oscillator. In the operating range of ultra-high-frequencies, this inductance value is substantially greater than the inductance value of the lead inductances 27 and 29 in series. The inductance of inductor 23 and the capacitance of condenser 24 preferably should have an inductance-to-capacitance ratio at least equal to 100,000. These requirements may be conveniently achieved by a resonant circuit structure 33 represented in Fig. 3.

This device includes a U-shaped supporting frame 34 of conductive material and a pair of coil supports 35 and 36 of an electrical insulating material are fixed at the open and bight ends, respectively, of the frame. A cylindrical coil, which constitutes inductor 23, is constructed of a plurality of turns of a flat conductive ribbon and is supported by members 35 and 36 with the axis thereof parallel to and between the legs of frame 34. The open end of frame 34 is electrically closed by a conductive strip 37, and a C-shaped strap 38 of flexible, conductive material is electrically and physically connected at each end to the ends of member 37. A cylindrical tuning element 39 of conductive material is electrically and physically connected at one end to the body portion of C-shaped member 38 and is positioned to traverse openings in members 35 and 37 that are in coaxial alignment with coil 23. Element 39 thus is supported for axial movement into and out of one end of coil 23 to constitute therewith the variable condenser 24 of Figs. 1 and 2. The coil and condenser so formed resonate at selected frequencies within a wide range of operating frequencies depending upon the relative positions of the coil and tuning element. Movement of element 39 into the coil is limited to a distance not exceeding approximately 30% of the axial length of the coil in order that substantially only a capacitance variation is effected in resonant circuit 33. A structure similar in many respects to the one just described is disclosed and claimed in the copending application of Arvid E. Chelgren, Serial No. 146,845, filed February 28, 1950, now Patent No. 2,595,764, issued May 6, 1952, for a "High Frequency Resonant Circuit" and assigned to the present assignee.

In describing the operation of the oscillation generator constructed in accordance with the invention, it may be helpful to consider a specific example which is presented purely by way of illustration. Tube 10 is a type 6F4 built into a conventional miniature type envelope. The grid-plate capacitance (condenser 30) is approximately 2 micro-microfarads (μμf.), the grid-cathode capacitance (condenser 31) is approximately 2.5 μμf. and anode-cathode capacitance (condenser 32) is in the neighborhood of 0.5 μμf. The lead inductances 27, 28 and 29 are approximately .0006 microhenries (μh.) while impedance 21 is formed by three pieces of enameled wire twisted together for one-quarter of an inch and presents an inductance, somewhat greater than the lead inductance, in the cathode circuit of device 10. Inductor 23 has an inductance of 0.1 μh. and condenser 24 has a maximum capacitance of 1.0 μμf. and is adjustable to a minimum capacitance of approximately .25 μμf. The circuit thus formed between control electrode 13 and anode 11 of tube 10 resonates at selected frequencies within the range of from approximately 500 to 850 mc./s. depending upon the relative positions of coil 23 and slug 39 of structure 33.

With reference once again to the equivalent circuit of the oscillation generator shown in Fig. 2, it will be seen that the anode 11 and control electrode 13 of device 10 are coupled to respective terminals of the resonant circuit 23—24 and that the cathode 12 is coupled to anode 11 by means of interelectrode capacitance 32. In operation, since control electrode 13 is effectively grounded, the potential between cathode and ground varies in phase with anode-ground voltage variations. Thus, a grid-cathode voltage is supplied in the opposite phase to the voltage developed between anode and ground. This grid excitation provides the required condition for oscillation, inasmuch as a phase reversal is effected within tube 10 proper.

It will be further observed from Fig. 2 that lead inductances 27 and 29 are in series with the principal inductor 23 but, inasmuch as the effective inductance values of the leads are small compared with that of coil 23, they form a small part of the frequency-determining circuit of the oscillation generator. Hence, device 10 may be conveniently replaced without materially altering the frequency characteristics of the generator due to variations in lead lengths for different tubes.

It will further be observed that the anode and control-electrode leads are in circuit with the resonant circuit 23—24. This circuit is so arranged as to place the points of zero potential at these leads or in other words at the socket (not shown) by means of which device 10 is connected into the circuit. Since the zero potential points are at the socket, the insulation thereof need not be as good as otherwise necessary and a low cost socket may be suitably employed.

The condensers 24 and 30 effectively constitute an impedance divider across inductor 23, and anode 11 and control electrode 13 are connected to the terminals of condenser 30. As pointed out previously, condenser 24 is smaller than condenser 30 and, consequently, the anode and control electrodes are coupled to the resonant circuit at a relatively low impedance point, and therefore, the effect of the tube on the Q of the circuit is minimized. Furthermore, since condensers 24 and 30 are in series in a resonant circuit with inductor 23, the smaller condenser 24 is the primary frequency-determining element compared with condenser 30 and not only is tube replacement facilitated but frequency drift due to the variations of condensers 30, 31 and 32 with tube warm-up is minimized.

It is important to note that the oscillation generator includes but a single mesh resonant circuit. This is comprised of the inductors 23, 27 and 29 in series with one another and with the condensers 24 and 30. As a result, at any setting of condenser 24, the oscillation generator operates at one and only one frequency.

Referring now to Fig. 4, there is represented a complete signal-translating system, specifically, a superheterodyne receiver, including an oscillation generator in accordance with the present invention. The receiver comprises an antenna system 40 coupled by means of a coil 41 to a coil 42 which is included in a resonant circuit 43 similar in many respects to the one described in connection with Fig. 3. Instead of coil 42 being electrically insulated from a frame 44 of structure 43 it is electrically connected at one end thereto. A conductive tuning element 45 is supported for movement into and out of the other end of the coil to constitute therewith a variable condenser.

An ultra-high-frequency oscillation generator G which is similar to the one described in connection with Figs. 1 through 3 is included in the receiver and similar elements are designated by identical reference numerals. The resonant circuit 33 is inductively coupled with the resonant circuit 43 as represented by the bracket M, which refers to the mutual impedance therebetween. A mechanical link 46 connects tuning elements 39 and 45 to provide ganged or uni-controlled operation of the circuits 33 and 43 over the operating range of frequencies.

By means of a tap 47 on coil 42 and a connection to frame 44 the resonant circuit 43 is coupled with a mixing device 48, for example, a germanium crystal. Device 48 is coupled to an intermediate-frequency amplifier 49 of one or more stages, in turn coupled to a detector 50. The detector is coupled to an utilization device 51 through an audio-frequency amplifier 52 which may comprise one or more stages of amplification. The stages 49, 50 and 52 may be of any well known construction, and device 51 may be a loudspeaker if the receiver of Fig. 4 is adapted to receive sound modulated signals.

The operation of the receiver of Fig. 4 is generally the same as that of any conventional superheterodyne receiver and will be understood by those skilled in the art. The arrangement, however, differs from those of the prior art in the particular circuit utilized for generator G, constructed in accordance with the invention, and in the construction of resonant circuits 33 and 43 which are the subject of the aforementioned Chelgren patent.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An ultra-high-frequency oscillation generator comprising: an electron-discharge device having anode, cathode and control electrodes; a condenser having a capacitance small relative to the interelectrode capacitances of said device; an inductor of such inductance value as to resonate with said condenser at a frequency corresponding approximately to the desired operating frequency of said oscillator; conductive means connecting said condenser and said inductor in series relation between said anode and said control electrodes; and a cathode impedance connected to said anode and control electrodes to complete an oscillation generating system, in which the operating frequency is determined by a single mesh resonant circuit comprising the anode-control electrode interelectrode capacitance of said device, said condenser, said inductor, and the self-inductance of said conductive means.

2. An ultra-high-frequency oscillation generator comprising: an electron-discharge device having anode, cathode and control electrodes; a condenser having a capacitance small relative to the interelectrode capacitances of said device; an inductor of such inductance value as to resonate with said condenser at a frequency corresponding approximately to the desired operating frequency of said oscillator and providing with said capacitance an inductance-to-capacitance ratio at least equal to 100,000; conductive means connecting said condenser and said inductor in series relation between said anode and said control electrodes; and a cathode impedance connected to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

3. An ultra-high-frequency oscillation generator comprising: an electron-discharge device having anode, cathode and control electrodes; a condenser having a capacitance no greater than one-half of the interelectrode capacitance of said anode and control electrodes; an inductor of such inductance value as to resonate with said condenser at a frequency corresponding approximately to the desired operating frequency of said oscillator; conductive means connecting said condenser and said inductor in series relation between said anode and said control electrodes; and a cathode impedance connected to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

4. A tunable ultra-high-frequency oscillation generator comprising: an electron-discharge device having anode, cathode and control electrodes; resonant circuit means including a cylindrical coil having a plurality of turns of a flat conductive ribbon and a cylindrical tuning element of conductive material supported in coaxial alignment with said coil at one end thereof to constitute therewith a condenser, said condenser having a capacitance small relative to the interelectrode capacitances of said device and said coil having an inductance value to resonate with said condenser at approximately a desired operating frequency of said oscillator; conductive means connecting the other end of said coil and said tuning element in series relation between said anode and said control electrodes; and a cathode impedance connected to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

5. An ultra-high-frequency oscillation generator tunable over a wide range of frequencies comprising: an electron-discharge device having anode, cathode and control electrodes; resonant circuit means including a cylindrical coil having a plurality of turns of a flat conductive ribbon and a cylindrical tuning element of conductive material supported in coaxial alignment with said coil for movement into and out of one end thereof to constitute therewith a variable condenser, said condenser having a maximum capacitance small relative to the interelectrode capacitances of said device and said coil having an inductance value to resonate with said condenser at selected frequencies within said range determined by the relative positions of said coil and said tuning element; conductive means connecting the other end of said coil and said tuning element in series relation between said anode and said control electrodes; and a cathode impedance connected to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

6. An ultra-high-frequency oscillation generator comprising: an electron-discharge device having anode, cathode and control electrodes and conductive leads for completing connections to said electrodes; a condenser having a capacitance small relative to the interelectrode capacitances of said device; an inductor of such inductance value as to resonate with said condenser at a frequency corresponding approximately to the desired operating frequency of said oscillator and substantially large relative to said electrode lead inductances of said device; conductive means connecting said condenser and said inductor in series relation between said anode and said control electrodes; and a cathode impedance, connected to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

7. An ultra-high-frequency oscillation generator comprising: an electron-discharge device having anode, cathode and control electrodes and a heater element for said cathode; a condenser having a capacitance small relative to the interelectrode capacitances of said device; an inductor of such inductance value as to resonate with said condenser at a frequency corresponding approximately to the desired operating frequency of said oscillator; conductive means connecting said condenser and said inductor in series relation between said anode and said control electrodes; and a tri-filar impedance element, one end of each of the windings thereof being connected respectively to said cathode and to each of the two terminals of said heater element, and the other ends coupled to said anode and control electrodes to complete an oscillation generating system in which the operating frequency is determined by a single mesh resonant circuit consisting of the anode-control electrode interelectrode capacitance of said device, said condenser, said inductor, and the self-inductance of said conductive means.

JOHN F. BELL.

References Cited in the file of this patent

UNITED STATES PATENTS

| Number | Name | Date |
|---|---|---|
| 1,294,326 | Bethenod | Feb. 11, 1919 |
| 1,452,032 | Farrington | Apr. 17, 1923 |
| 1,942,385 | Piety | Jan. 2, 1934 |
| 2,127,334 | Hathaway | Aug. 16, 1938 |
| 2,403,349 | Dolberg | July 2, 1946 |
| 2,532,834 | Christenson | Dec. 5, 1950 |

FOREIGN PATENTS

| Number | Country | Date |
|---|---|---|
| 519,268 | France | Jan. 21, 1921 |
| 561,787 | Great Britain | June 5, 1944 |